United States Patent
Dou et al.

(10) Patent No.: US 9,442,917 B2
(45) Date of Patent: Sep. 13, 2016

(54) DETECTING SEMANTIC ERRORS IN TEXT USING ONTOLOGY-BASED EXTRACTION RULES

(71) Applicant: The State of Oregon acting by and through the State Board of Higher Education on behalf of the University of Oregon, Eugene, OR (US)

(72) Inventors: Dejing Dou, Eugene, OR (US); Stephen Fickas, Eugene, OR (US)

(73) Assignee: University of Oregon, Eugene, OR (US)

( * ) Notice: Subject to any disclaimer, the term of this patent is extended or adjusted under 35 U.S.C. 154(b) by 320 days.

(21) Appl. No.: 14/329,888

(22) Filed: Jul. 11, 2014

(65) Prior Publication Data
US 2015/0019207 A1    Jan. 15, 2015

Related U.S. Application Data

(60) Provisional application No. 61/844,991, filed on Jul. 11, 2013.

(51) Int. Cl.
*G06F 17/27* (2006.01)

(52) U.S. Cl.
CPC ......... *G06F 17/2785* (2013.01); *G06F 17/273* (2013.01)

(58) Field of Classification Search
CPC ............................. G06F 17/2785; G09B 7/00
See application file for complete search history.

(56) References Cited

U.S. PATENT DOCUMENTS

| | | | | |
|---|---|---|---|---|
| 4,994,966 A * | 2/1991 | Hutchins | ............... | G06F 17/274 704/9 |
| 5,521,816 A * | 5/1996 | Roche | ............... | G06F 17/273 704/9 |
| 5,737,617 A * | 4/1998 | Bernth | ............... | G06F 17/274 704/1 |
| 6,115,683 A * | 9/2000 | Burstein | ............... | G06F 17/2705 434/353 |
| 6,405,162 B1 * | 6/2002 | Segond | ............... | G06F 17/2785 704/9 |
| 2002/0138337 A1 * | 9/2002 | Yanase | ............... | G09B 7/00 |
| 2003/0120481 A1 * | 6/2003 | Murata | ............... | G06F 17/274 704/9 |
| 2003/0224339 A1 * | 12/2003 | Jain | ............... | G09B 7/00 434/350 |
| 2004/0175687 A1 * | 9/2004 | Burstein | ............... | G06F 17/27 434/353 |
| 2006/0053151 A1 * | 3/2006 | Gardner | ............... | G06F 17/279 |
| 2007/0271510 A1 * | 11/2007 | Grigoriu | ............... | G06F 17/2247 715/257 |
| 2007/0288513 A1 * | 12/2007 | Jenkins | ............... | G06Q 10/10 |
| 2009/0192787 A1 * | 7/2009 | Roon | ............... | G06F 17/2715 704/9 |
| 2010/0063798 A1 * | 3/2010 | Ku | ............... | G06F 17/2863 704/9 |
| 2011/0313757 A1 * | 12/2011 | Hoover | ............... | G06F 17/274 704/9 |
| 2012/0290299 A1 * | 11/2012 | Basson | ............... | G10L 15/063 704/235 |

OTHER PUBLICATIONS

Jiménez-Ruiz et al. "Logic-based assessment of the compatibility of UMLS ontology sources" Journal of Biomedical Semantics 2011, 2(Suppl 1):S2.

(Continued)

*Primary Examiner* — Eric Yen
(74) *Attorney, Agent, or Firm* — Lumen Patent Firm

(57) ABSTRACT

Semantic errors in a natural language text document are automatically detected by matching sentences in the document with stored ontology-based extraction rules that express both logically correct and logically incorrect relationships between the classes and properties of an ontology for a predefined knowledge domain of relevance to the natural language text document. The matching identifies logically correct and incorrect statements in the document which may be used for various applications such as automatic grading.

7 Claims, 2 Drawing Sheets

(56) References Cited

OTHER PUBLICATIONS

Burek et al., "Indexing student essays paragraphs using LSA over an integrated ontological space" eLearn '04: Proc. Workshop on eLearning for Computational Linguistics and Computational Linguistics for eLearning, p. 32-37, Assoc. for Computational Linguistics Stroudsburg, 2004.

Ozcan et al., "Concept-Based Feature Generation and Selection for Information Retrieval," Twenty-Third AAAI Conference on Artificial Intelligence, Chicago, 2008.

Gurevych et al. "Semantic coherence scoring using an ontology" NAACL '03: Proc. 2003 Conference of the North American Chapter of the Assoc. for Computational Linguistics on Human Language Technology—vol. 1, pp. 9-16, 2003.

Sami et al., "Automated Score Evaluation of Unstructured Text using Ontology" International Journal of Computer Applications 39(18):19-22, Feb. 2012.

Chen et al., "Using an Ontology for Improved Automated Content Scoring of Spontaneous Non-Native Speech" 7th Workshop on the Innovative Use of NLP for Building Educational Applications, pp. 86-94, Montreal, Canada, Jun. 3-8, 2012.

Gutierrez et al., "Providing Grades and Feedback for Student Summaries by Ontology-based Information Extraction" CIKM'12: Proc. 21st ACM international conference on Information and knowledge management, pp. 1722-1726, Oct. 29-Nov. 2, 2012.

Gutierrez et al., "Hybrid Ontology-Based Information Extraction for Automated Text Grading", ICMLA 2013: 12th International Conference on Machine Learning and Applications, Dec. 4-7, 2013, p. 359-364.

\* cited by examiner

DETECTING SEMANTIC ERRORS IN TEXT USING ONTOLOGY-BASED EXTRACTION RULES

CROSS-REFERENCE TO RELATED APPLICATIONS

This application claims priority from U.S. Provisional Patent Application 61/844,991 filed Jul. 11, 2013, which is incorporated herein by reference.

STATEMENT OF GOVERNMENT SPONSORED SUPPORT

This invention was made with Government support under grant (or contract) no. IIS-1118050 and IIS-1013054 awarded by the National Science Foundation. The Government has certain rights in the invention.

FIELD OF THE INVENTION

The present invention relates generally to computer-implemented methods for natural language processing of text documents. More specifically, it relates to methods for identifying logical errors in natural language text documents.

BACKGROUND OF THE INVENTION

Current natural language processing (NLP) tools can detect errors in text documents reflecting incorrect spelling, syntax, and grammar. These types of errors, however, do not relate to the underlying meaning of the subject matter of the text, i.e., they are not semantic errors.

These limitations have motivated the development of more sophisticated tools for analyzing natural language documents. One important application of such tools is automatic grading systems for summaries and essays in education. Most existing automated grading systems for student summaries are based on statistical models, such as latent semantic analysis (LSA) which detects statistical word similarity between a teacher's model document and a student's submitted document. If words occur with similar frequencies in the two documents, then the documents are considered to be statistically similar, and the student submission is given a high grade by the system. More specifically, LSA treats each essay as a matrix of word frequencies and applies singular value decomposition (SVD) to the matrix to find an underlying semantic space. Each student essay is represented in that space as a set of vectors. A similarity measure is then computed based on the cosine similarity between the vectors of the student essay and vectors of a model text document. The cosine similarity is then transformed to a grade and assigned to the student essay.

Although LSA and other semantic similarity techniques has proven to be very useful, they cannot detect logical errors which reflect a student's misunderstanding of the proper relationships between the words. Consequently, a student's essay that is semantically similar to an instructor's model essay but uses the terms in a logically incorrect manner would be inappropriately accorded a high grade. In short, LSA assigns inaccurate grades to student submissions that incorrectly use the correct terminology. In addition, because LSA is a statistical approach that treats each document as a whole, it cannot provide feedback about specific sentences in the document.

As an alternative to statistical approaches, some grading systems can identify correctly used concepts using a semantic network which represents the correct relationships between concepts of the subject matter. For example, an existing commercial system called SAGrader™ automatically analyzes student essays using a semantic network and provides feedback including confirming the correct relationships between concepts and identifying missing content. However, it is hard to use semantic network to express complex logic relationships such as negation and disjointness, which are fundamental for detecting logic errors.

SUMMARY OF THE INVENTION

The present invention, called Ontology-based Information Extraction (OBIE) offers the same advantages that semantic networks offer, such as the possibility of generating feedback and no need of gold standard summaries. In addition, however, its use of ontologies provides it with more expressive power than semantic networks by allowing the representation of disjointness and negations, which cannot be done by semantic networks. Ontologies can provide richer representations than semantic networks by offering consistency (e.g., semantic networks have ambiguous interpretations of ISA relationships), and can represent disjointness and negations. By incorporating a heuristic ontology debugging technique into the OBIE system, it can determine axioms that can create logical contradictions in the domain. These axioms are translated into rule-based information extractors that identify incorrect statements. By knowing which statements are inconsistent with respect to the ontology and why (through the inconsistent axioms), it is possible to produce more detailed and accurate feedback.

Thus, in addition to being able to determine whether or not certain information is present in the text or consistent with a semantic network, embodiments of the present invention are able to detect whether or not certain information is true (i.e., correct) or false (i.e., incorrect). The present invention appears to provide the first system to identify semantic errors in natural language text based on an ontology. It is based in part on the insight that, because the statements of a summary should be entailed from the domain ontology, if a statement of a summary is incorrect, it will be inconsistent with the ontology. So, understanding how ontology inconsistency is managed can lead to mechanisms to identify and extract incorrect summary statements.

It is an advantage of the present method that it separately considers sentences in the text, and does not need to consider the document as a whole (all sentences) simultaneously, as is the case for LSA systems. The present method thus divides the text into small pieces based on sentences, facilitating the processing of even extremely large text. The sentences may be processed sequentially, or in parallel if appropriate hardware is available.

In one aspect, the present invention provides a method for identifying semantic errors in natural language text documents. The method uses ontology-based text extraction rules that express both correct and incorrect logical relationships between classes and properties in a specified knowledge domain. These extraction rules are composed with reference to an ontology, a formal specification of concepts and relationships in the knowledge domain.

Given extraction rules derived from an ontology, an information extraction tool according to embodiments of the present invention can detect semantic (logic) errors from text. More specifically, ontological concepts and relationships are used to create extraction rules. Based on ontology constraints (e.g., subsumption and disjointness between concepts), patterns that are logically inconsistent with the ontology are defined to create rules to extract incorrect statements as well as rules to extract correct statements. The rules are then used to identify correct and incorrect statements in a natural language text document. The method can be applied to classroom or online education (e.g., automatic grading), legal document checking, and financial document checking.

In one aspect, the invention provides a computer-implemented method for automatically detecting semantic errors in a natural language text document using ontology-based extraction rules. The method includes inputting to a computer the natural language text document, storing the ontology-based extraction rules in the computer, matching by the computer sentences in the natural language text document with the ontology-based extraction rules to identify logically correct and incorrect statements in the natural language text document, and outputting from the computer a list of the logically correct and incorrect statements in the natural language text document. The ontology-based extraction rules express formal logical relationships between classes and properties of an ontology for a predefined knowledge domain of relevance to the natural language text document. In particular, the ontology-based extraction rules include extraction rules that express logically correct relationships between the classes and properties of the ontology as well as extraction rules that express logically incorrect relationships between the classes and properties of the ontology. The ontology-based extraction rules may also include extraction rules that express logically incomplete relationships between the classes and properties of the ontology. In some embodiments, the method also includes matching the sentences in the natural language text document using machine learning generated information extractors to identify logically correct and incorrect statements in the natural language text document.

Preferably, the method includes pre-processing the natural language text document by performing spelling correction, completion of sentences, and eliminating non-informative words. The method preferably also includes parsing the natural language text document into the sentences prior to matching. Each sentence may be matched separately with the ontology-based extraction rules, either sequentially or in parallel.

In some embodiments, based in part on the logically correct and incorrect statements identified in the natural language text document, a grade for the natural language text document may be computed. The logically correct and incorrect statements identified in the natural language text document may also be used for a variety of other applications.

DETAILED DESCRIPTION

In a preferred embodiment, the invention may be realized as an automatic grading system. Although embodiments described below will use the document grading application for the sake of definiteness, those skilled in the art will appreciate that the principles and techniques of the invention may also be used in a variety of applications.

Figure 1:
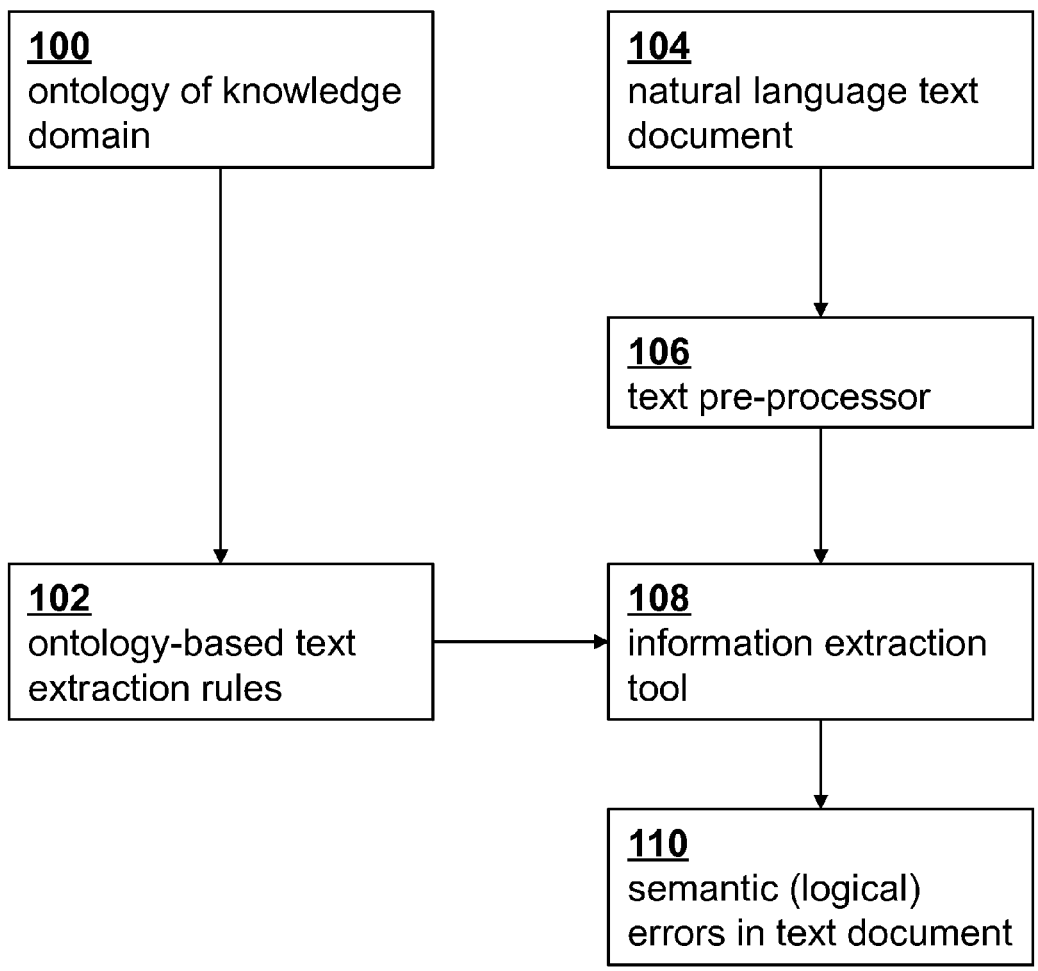
FIG. 1 is a functional block diagram providing an overview of a method for automatically detecting semantic errors in a natural language text document using ontology-based extraction rules according to an embodiment of the invention.

FIG. 1 is a functional block diagram providing an overview of an embodiment of the invention.

An ontology 100 is selected based on the knowledge domain of relevance to the particular student writing assignment, e.g., a summary representing ecological concepts. The ontology 100 provides a formal representation of concepts and relationships of the knowledge domain. It includes a list of important concepts and their relationships. The relationships can be between different classes, between different properties, or between classes and properties. More specifically, an ontology includes classes (i.e., types of objects, kinds of things, or general concepts) and properties (i.e., attributes, features, or parameters that objects, things, or classes can have, such as their parts or sub-classes). An ontology also includes axioms (i.e., relationships) that express the possible ways classes and objects can be related to each other and to their properties. The ontology is constructed by either a human or machine beforehand. The ontology may be defined, for example, in a web ontology language (OWL).

An ontology of ecosystems concepts, for example, contains concepts such as Producer, Autotroph, and Consumer. Significantly, an ecosystems ontology can represent disjointness relationships. For example, Producer and Autotroph are equivalent concepts and both of them are disjoint with Consumer. The disjointness cannot be represented in a semantic network.

With reference to an ontology, a human or computer creates ontology-based extraction rules 102 expressing logical relationships among classes and properties in the ontology. Also, the human or machine creates the extraction rules expressing possible incorrect logic relationships according to correct relationships. In other words, based on ontology constraints (e.g., disjointness between concepts), patterns that are logically inconsistent with the ontology are used to create rules to extract incorrect statements. The extraction rules may be written, for example, in Perl, Java, or another language used for natural language processing. It is envisioned that extraction rules may be created automatically by computer.

The following concrete example illustrates an extraction rule used to identify semantically incorrect statements, derived from disjointness relationships in an ecosystems ontology. In the ontology, because Plant, Algae and Phytoplankton are subclasses of Autotroph and Producer, they cannot be subclasses of a concept which is disjoint with either Autograph or Producer. This logical rule is converted to the following extraction rule, represented in Perl:

$_=~/(plant|algae|phytoplankton).+(is|are).+(?!(producer|autotroph))/i

The set of extraction rules 102 are stored in a computer memory. The extraction rules express formal logical relationships between classes and properties of the ontology for a predefined domain of knowledge. Specifically, the extraction rules include both extraction rules that express logically correct relationships between the classes and properties, and extraction rules that express logically incorrect relationships between the classes and properties.

During operation, a natural language text document 104 input to the system is preferably processed first by a text preprocessor 106, which performs spelling correction, completion of sentences, and elimination of non-informative words using standard techniques well known in the art. The preprocessing also parses the text into separate sentences by identifying subject, verb, and object.

The preprocessed text is then sent to an information extraction tool 108 that performs extractions with respect to a specific class, a property, or an axiom of an ontology, as expressed by extraction rules 102 developed for correct, incorrect, and incomplete statements with respect to the ontology. More specifically, for each sentence in the text, the extraction tool determines whether it matches any correct extraction rules or any incorrect extraction rules (e.g., in Perl). All matched statements (Sub, Verb, Obj) are recorded as matching either as correct or incorrect extraction rules.

The result of the extraction is a list of semantic (logical) errors 110 in the document, e.g., specific sentences and the specific semantic error identified. This may be the end of the analysis if the users are only interested in incorrect relationships. Otherwise, the list may also include correct statements.

For example, suppose the sentence "Banana is one kind of Consumer" is present in the student text document. In the ecosystems ontology, Banana is an instance of Plant, which is a subclass of Producer, which is disjoint with Consumer. Consequently, this sentence would be identified as incorrect by matching with an extraction rule that expresses the disjointness relationship between Banana and Consumer. The error will state that Banana should be one kind of Producer but not Consumer.

Additional steps may compute a grade for the document based, for example, on the number of correct and incorrect statements identified. The grade may take into account other factors as well, such as conventional statistical similarity techniques. Grading metrics may also assess relevance, completeness, and importance.

Figure 2:
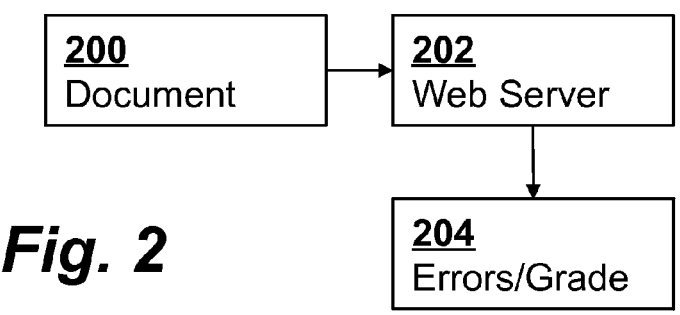
FIG. 2 is a block diagram of a system which may be used to implement a method for automatically detecting semantic errors in a natural language text document using ontology-based extraction rules according to an embodiment of the invention.

As illustrated in the block diagram of FIG. 2, the method may be physically realized as a computer web server 202 which receives documents 200 submitted via the internet, processes the document, and returns a list of errors and/or grade 204 that was assigned to the document. Related tools may include a graphical user interface (GUI) and application programming interface (API) to help humans who are not Perl or Java experts to write extraction rules to save human time, analogous to a visual query builder used in the SQL database community to help people who are not SQL experts to write queries. Ontologies can be considered as one conceptual model and easily represented as graphs.

Figure 3:
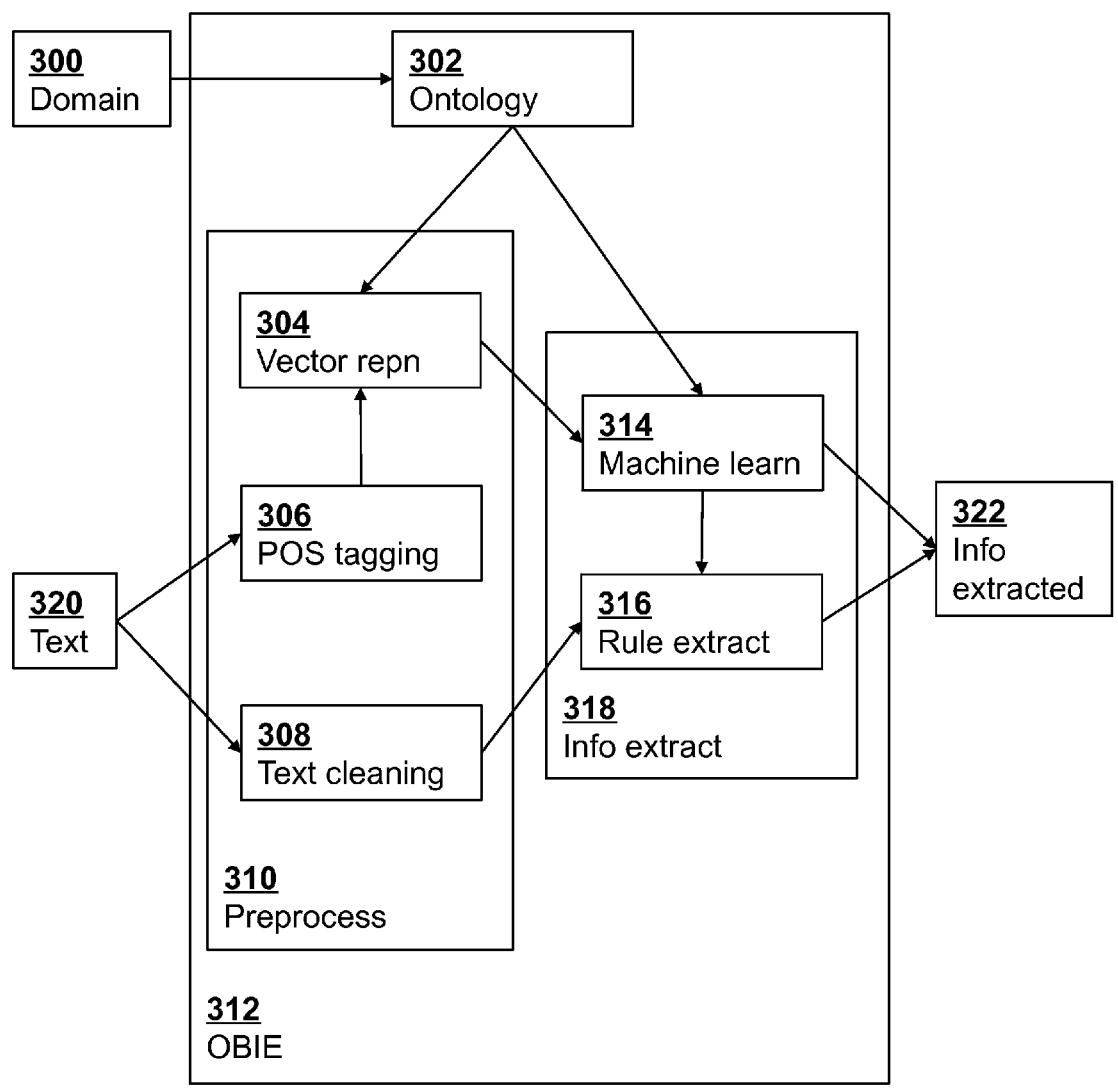
FIG. 3 is a functional block diagram illustrating a method for automatically detecting semantic errors in a natural language text document using ontology-based extraction rules according to an alternate embodiment of the invention.

FIG. 3 is a functional block diagram illustrating an alternate embodiment of the invention. The OBIE system 312 receives natural language text document 320 as input and generates extracted information 322 as output. The extracted information may include a list of sentences that are logically incorrect relative to a predetermined knowledge domain 300. This embodiment illustrates an OBIE system to do summary grading. The OBIE system follows a component based architecture using the following components: Ontology 302: Provides formal representation of concepts and relationships of a domain. Preprocessors 310: Converts text into a format that can be processed by components of the next phase, information extractors. Information Extractors 318: Performs extractions with respect to a specific class or a property of an ontology (and considered the most important component in the architecture.)

The ontology 302 may be manually constructed based on a knowledge domain 300. Given a domain, there may be a pre-existing well-developed ontology. The system can directly adopt such an ontology in whole or in part, depending on how much domain knowledge is needed for the information extraction. If there is no pre-existing well-developed ontology, a new application driven ontology may be created which covers the knowledge needed for the information extraction purpose. To construct the ontology two main guidelines may be used: it should contain all concepts and relationships that are relevant to the grading, and it must not include any other concepts that are not required for the grading. These criteria lead to an ontology that is highly connected, but has a small number of hierarchical relationships between concepts. For example, if the system is designed to grade student essays related to ecosystems, where students have different levels of background knowledge, the construction may be constrained to the explicit facts from a domain article. Alternatively, it could include facts from the entire domain of ecosystems. Because of the strict construction criteria and the nature of the ecosystem article (an introduction to a domain), the ontology is mainly a list of important concepts and relationships.

Preprocessing 310 includes part-of-speech (POS) tagging 306, and generation of a vector representation 304 with reference to the concepts of the ontology 302. These steps prepare the information for processing by machine learning 314 by transforming the text into a numerical representation. For the classifier, the text is represented as a binary vector. The vector also contains part-of-speech information (e.g., number of verbs and nouns) as features. For the probabilistic model, the text is enhanced with part-of-speech tags.

Text cleaning 308 is also performed in order to simplify the complexity of the summaries and to obtain the best performance of the rule-based information extraction process 316. The text cleaning 308 considers completing sentences, eliminating non-informative words, removing non-letter characters, text merging, and correcting misspellings.

The ontology 302 formally defines the concepts and relationships in the knowledge domain 300. The relationships can be seen as triples of the form {concept1, relationship, concept2}. The triple can be mapped to the typological form of a sentence (subject, verb, object), where subject maps to concept1, verb maps to relationship, and object maps to concept2.

This leads to an extraction rule for each relationship. Since properties of a concept are inherited by its sub-concepts or by its equivalent concepts, we consider the use of first order logic (FOL) rules to combine sets of axioms from the ontology into a smaller set of logical rules to avoid the creation of an oversized set of extraction rules. The resulting logical rules contain concepts and properties from the original set of ontological axioms. In other words, the set of original axioms entail the new logical rules, which is an expanded representation of the original set. Extraction rules may be represented as regular expressions that capture specific types of information.

As an illustrative example, incorrect axioms in an ontology may be used to define the information extractors for detecting incorrect statements. For example, the following axiom means if an ontology defines 1) a person who is taught by a professor must be a student, and 2) a professor cannot be a student, then any statement about a professor teaching another professor is incorrect.

$$\frac{\forall x \forall y ((\text{Professor}(x) \land \text{Teaches}(x, y)) \to \text{Student}(y))}{\forall x (\text{Professor}(x) \leftrightarrow \neg \text{Student}(x))}$$
$$\overline{\forall x \forall y ((\text{Professor}(x) \land \text{Teaches}(x, y) \land \text{Professor}(y)) \to \bot)}$$

In this embodiment, the information extractors, which are the OBIE components that do the extraction process, can have multiple dimensions. These dimensions allow the information extractors to represent different ontological concepts, to have different implementations (e.g., machine learning and extraction rules), and to perform different functions (i.e., extracting correct or incorrect statements). These dimensions may be used to combine different information extractors in one hybrid OBIE system, letting the system have multiple configurations. The combination of information extractors that perform different functions can provide a better understanding of a graded text, and the combination of information extractors that have different implementations can improve the performance of the extraction process.

In general, the process of extracting information from plain text can be done by applying extraction rules and/or by using machine learning generated information extractors. Based on regular expression, extraction rules capture information by identify specific elements in text. In most cases, extraction rules are simple to design, and they have relatively good performance. However, because they are based on specific cues crafted manually, extraction rules are difficult to generalize and do not scale well.

On the other hand, with machine learning methods such as Support Vector Machine, Naive Bayes, or Conditional Random Fields, the information extraction task is transformed into a labeling and supervised learning task, where classification methods and probabilistic models try to identify which elements from a sentence are part of the sought information. These techniques obtain good accuracy, and they scale well. However, machine learning techniques are data-driven, so the performance of these methods depend on the quality and quantity of the data used for the training.

As consequence of these strengths and weaknesses, some ontological concepts are more difficult to extract than others for any given approach. In order to maximize the extraction capabilities of our system, some embodiments of the invention have incorporated both extraction rules and machine learning based information extractors into a hybrid OBIE system.

In some embodiments, multiple extraction rules with different level of abstraction (i.e., hierarchy of extraction rules) may be used for extracting one concept. In other embodiments, single, one level extraction rules may be used. Each extraction rule represents one axiom of the ontology. To identify statements that are inconsistent with the ontology, extraction rules are defined for the consistent and inconsistent axioms of each concept.

The rule extraction step 316 identifies three types of statements in the document: correct statements, incorrect statements, incomplete statements.

Rules for correct statements are used by rule extractor 316 to identify which concepts and relationships are presented in the document, and which are not presented. The resulting extracted information 322 from rules for correct statements tells how much of a student's document is contained in the ontology and how much is missing from it.

If we consider that statements in a summary should be entailed from the domain ontology, an incorrect statement will be inconsistent with the ontology. Rules for inconsistent statements can be derived from common errors such as having properties with conflicting domain or range, ignoring disjointness between classes, and conflicting axioms through propagation of axioms. Following these common errors and the constraints presented in the ontology, a set of logic rules on inconsistency are created. Also, rules on inconsistency can be derived from the consistent logic rules. The extraction rules created from the inconsistency logic rules are used by the extractor 316 to identify incorrect statements.

Statements that include a concept or relationship that is not defined in the ontology are considered incomplete. The most frequent type of incomplete statements is related to a relationship between two concepts but one of them is not in the ontology. To identify incomplete statements, the extraction rules for incompleteness look for statements in the document that have an unknown element. The extraction rule that implements the logic rule for incompleteness checks that if in a sentence an element of a stated relationship is not listed in the ontology, then the sentence is incomplete with respect to the ontology.

The machine learning based information extractors 314 are preferably implemented following a two-phase classification scheme. In the first phase, the method identifies which sentences from the document contain the information the extractor seeks. The process is defined as a binary classification task (Naive Bayes), where one class corresponds to sentences that carry the information and the other class corresponds to sentences that do not have the information. The text is transformed into a binary vector, which also contains some metadata. For example, the metadata includes the position in the sentence where the certain information (e.g., concept) is found.

The second phase of the platform identifies the elements of the sentence (words) that contain the information. This is done by a probabilistic model (Conditional Random Fields). For this phase the text is enhanced with part-of-speech labels, metadata information used in the first phase, the output of the previous phase, and a group of extra features. The extra features include POS tags, stop words, the half of the sentence a word belong to (first or second) and capitalization information at word-level.

The information extracted 322 may be used directly, or used to automatically assign a grade to the document. The grade may be derived from the information extracted 322 as well as from other criteria such as relevance, completeness, and importance. A relevance metric considers what part of the summary is related to the article read by the students. The metric provides a ratio of how much of the summary can be matched with the extraction rules. A completeness metric considers how much of the article is contained in the summary. This metric indicates how many rules are matched in the summary. An importance metric gives a weight to each relationship, so that if a summary has most important relationships then it has a better grade than if the summary contains only the less important relationships.

The grades from the OBIE system result in a positive correlation with human grading and are superior to LSA grading because LSA does not address incorrect statements and consequently assigns a high score for mentioning many article concepts and relationships being mentioned, even when they are wrongly stated.

OBIE information 322 provides the raw basis for constructive feedback to students. The errors assist a student to rework his or her conceptualization, and can be used in the context of automated tutoring. Beyond simply showing errors, tutoring dialogs may leverage the OBIE output 322 by recognizing conceptually correct, incorrect, and incomplete ideas at the statement level. The OBIE system has the particular advantage that it provides meaningful feedback to students about the incorrect statements they have made in their documents.

Embodiments of the invention are not limited to the examples discussed herein. For example, other embodiments may include integrating text taxonomy as a complement to the ontology to allow a better link between the domain knowledge and importance of each idea in the text. Bring automation to the process widens the available material that can be supported, such as machine learning (e.g., classification) techniques as information extractors, or automatically generating extraction rules.

The invention claimed is:

1. A computer-implemented method for automatically detecting semantic errors in a natural language text document using ontology-based extraction rules, the method comprising:

inputting to a computer the natural language text document;

storing the ontology-based extraction rules in the computer, wherein the ontology-based extraction rules express formal logical relationships between classes and properties of an ontology for a predefined knowledge domain of relevance to the natural language text document, wherein the ontology-based extraction rules comprise extraction rules that express logically correct relationships between the classes and properties of the ontology, and wherein the ontology-based extraction rules comprise extraction rules that express logically incorrect relationships between the classes and properties of the ontology;

matching by the computer sentences in the natural language text document with the ontology-based extraction rules to identify logically correct and incorrect statements in the natural language text document;

outputting from the computer a list of the logically correct and incorrect statements in the natural language text document.

2. The method of claim 1 further comprising deriving a grade for the natural language text document based in part on the logically correct and incorrect statements in the natural language text document.

3. The method of claim 1 further comprising parsing the natural language text document into the sentences.

4. The method of claim 1 wherein the matching comprises matching each sentence separately with the ontology-based extraction rules, where the matching of each sentence separately is performed sequentially or in parallel.

5. The method of claim 1 wherein the ontology-based extraction rules comprise extraction rules that express logically incomplete relationships between the classes and properties of the ontology.

6. The method of claim 1 further comprising pre-processing the natural language text document by performing spelling correction, completion of sentences, and eliminating non-informative words.

7. The method of claim 1 further comprising matching the sentences in the natural language text document using machine learning generated information extractors to identify logically correct and incorrect statements in the natural language text document.

* * * * *